US008744626B2

(12) United States Patent
Johnson et al.

(10) Patent No.: US 8,744,626 B2
(45) Date of Patent: Jun. 3, 2014

(54) MANAGING AUTONOMOUS MACHINES ACROSS MULTIPLE AREAS

(75) Inventors: David August Johnson, Charlotte, NC (US); Noel Wayne Anderson, Fargo, ND (US); Kirk Narum Eisenbeis, Charlotte, NC (US)

(73) Assignee: Deere & Company, Moline, IL (US)

( * ) Notice: Subject to any disclaimer, the term of this patent is extended or adjusted under 35 U.S.C. 154(b) by 746 days.

(21) Appl. No.: 12/789,115

(22) Filed: May 27, 2010

(65) Prior Publication Data

US 2011/0295424 A1    Dec. 1, 2011

(51) Int. Cl.
*G05B 19/418* (2006.01)
*A01D 34/00* (2006.01)

(52) U.S. Cl.
USPC ............. 700/250; 700/258; 901/1; 701/50

(58) Field of Classification Search
USPC ............ 700/245, 250, 253, 255, 258; 901/1; 701/50, 494, 495
See application file for complete search history.

(56) References Cited

U.S. PATENT DOCUMENTS

| 4,706,200 | A | * | 11/1987 | Kishi et al. ............. 700/187 |
| 5,563,786 | A | | 10/1996 | Torii |
| 5,646,844 | A | | 7/1997 | Gudat et al. |
| 5,974,347 | A | * | 10/1999 | Nelson ................... 701/22 |
| 6,255,793 | B1 | | 7/2001 | Peless et al. |
| 7,010,425 | B2 | | 3/2006 | Gray et al. |
| 7,053,580 | B2 | | 5/2006 | Aldred |
| 7,167,797 | B2 | | 1/2007 | Faivre et al. |
| 7,222,004 | B2 | | 5/2007 | Anderson |
| 7,251,548 | B2 | * | 7/2007 | Herz et al. ............. 701/23 |
| 7,313,478 | B1 | | 12/2007 | Anderson et al. |
| 7,349,759 | B2 | * | 3/2008 | Peless et al. ........... 700/245 |
| 7,386,392 | B1 | | 6/2008 | Kabel et al. |
| 7,493,208 | B1 | | 2/2009 | Craine |
| 7,579,803 | B2 | * | 8/2009 | Jones et al. ............ 318/567 |
| 7,610,122 | B2 | | 10/2009 | Anderson |
| 7,792,606 | B2 | * | 9/2010 | Jager ..................... 700/245 |
| 2002/0156556 | A1 | * | 10/2002 | Ruffner ................. 701/23 |
| 2004/0249511 | A1 | * | 12/2004 | Jager ..................... 700/248 |
| 2005/0171644 | A1 | * | 8/2005 | Tani ...................... 700/253 |

(Continued)

FOREIGN PATENT DOCUMENTS

| DE | 19504475 | | 8/1995 |
| EP | 1933467 | A2 | 6/2008 |

(Continued)

OTHER PUBLICATIONS

European Search Report, Sep. 15, 2011, 2 pages.
Extended European Search Report, dated Feb. 13, 2014, regarding Application No. EP11164714.5, 15 pages.

*Primary Examiner* — Jason Holloway
(74) *Attorney, Agent, or Firm* — Yee & Associates, P.C.

(57) ABSTRACT

The different illustrative embodiments provide a system for autonomous machine management comprising a number of autonomous machines, a number of nodes, a performance estimation module, and a navigation system. The number of autonomous machines is configured to perform area coverage tasks in a worksite. The number of nodes is configured to define a number of worksite areas for the worksite. The performance estimation module is executed by a processor unit and configured to calculate a percentage of work completed in the number of worksite areas. The navigation system is configured to operate an autonomous machine to perform the area coverage tasks and move between the number of worksite areas.

17 Claims, 10 Drawing Sheets

(56) References Cited

U.S. PATENT DOCUMENTS

| | | |
|---|---|---|
| 2007/0192024 A1* | 8/2007 | Flann et al. ............... 701/207 |
| 2007/0250212 A1 | 10/2007 | Halloran et al. |
| 2007/0250412 A1 | 10/2007 | Anderson |
| 2008/0109126 A1* | 5/2008 | Sandin et al. ............... 701/23 |
| 2008/0183349 A1* | 7/2008 | Abramson et al. .......... 701/23 |
| 2009/0043462 A1 | 2/2009 | Stratton et al. |
| 2009/0132156 A1 | 5/2009 | Craine |
| 2009/0228165 A1 | 9/2009 | Ozick et al. |
| 2009/0254218 A1* | 10/2009 | Sandin et al. ............... 700/258 |
| 2011/0202175 A1* | 8/2011 | Romanov et al. ........... 700/250 |
| 2011/0295423 A1 | 12/2011 | Anderson |
| 2012/0041594 A1* | 2/2012 | Abramson et al. .......... 700/258 |
| 2012/0226381 A1* | 9/2012 | Abramson et al. .......... 700/255 |

FOREIGN PATENT DOCUMENTS

| | | |
|---|---|---|
| EP | 1977673 | 10/2008 |
| EP | 2078996 | 7/2009 |
| WO | WO03033218 A2 | 4/2003 |

* cited by examiner

US 8,744,626 B2

MANAGING AUTONOMOUS MACHINES ACROSS MULTIPLE AREAS

CROSS REFERENCE TO RELATED APPLICATIONS

This application is related to commonly assigned and co-pending U.S. patent application Ser. No. 12/789,061 entitled "Condition Based Keep-Out for Machines" all of which are hereby incorporated by reference.

FIELD OF THE INVENTION

The present invention relates generally to systems and methods for navigation and more particularly to systems and methods for mobile robotic navigation. Still more specifically, the present disclosure relates to a method and system for managing autonomous machines across multiple worksite areas.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. Some robotic devices are constrained to operate in a contained area, using different methods to obtain coverage within the contained area. These robotic devices typically have an integrated, fixed positioning and navigation system. Mobile robotic devices often rely on dead reckoning or use of a global positioning system to achieve area coverage. These systems tend to be inefficient and are often cost-prohibitive.

Mobile robotic devices often rely on visual landmarks for localization and navigation. Visual landmarks may not be present in certain areas of a worksite or in some worksites at all, such as large, open fields, for example. A worksite may be any area or location where robotic devices are used to perform physical tasks. Other visual landmarks that may be present, such as natural landmarks, for example, may have ambiguity and seasonal occlusion from vegetative growth during certain times or seasons.

Physical perimeters, such as fences or electronic boundaries of buried wire carrying a signal detectable by a robotic device, may also be used for localization and navigation. However, physical perimeters present a challenge in some situations. One example is when a sidewalk or driveway must be traversed to access a worksite.

SUMMARY

The different illustrative embodiments provide a system for autonomous machine management comprising a number of autonomous machines, a number of nodes, a performance estimation module, and a navigation system. The number of autonomous machines is configured to perform area coverage tasks in a worksite. The number of nodes is configured to define a number of worksite areas for the worksite. The performance estimation module is executed by a processor unit and configured to calculate a percentage of work completed in the number of worksite areas. The navigation system is configured to operate an autonomous machine to perform the area coverage tasks and move between the number of worksite areas.

The different illustrative embodiments further provide a boundary node comprising a power source, a number of inputs, a number of outputs, and a processor unit. The processor unit is configured to receive a number of signals from the number of inputs and transmit the number of signals using the number of outputs.

The different illustrative embodiments further provide a method for managing autonomous machines. A number of worksite areas is identified for a worksite. An area coverage task is performed in a first worksite area using an autonomous machine. A percentage of work completed for the first worksite area is calculated by the autonomous machine to form a calculated value. A determination is made as to whether a threshold value is met using the calculated value. In response to a determination that the threshold value is met, the autonomous machine is moved to a next worksite area.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
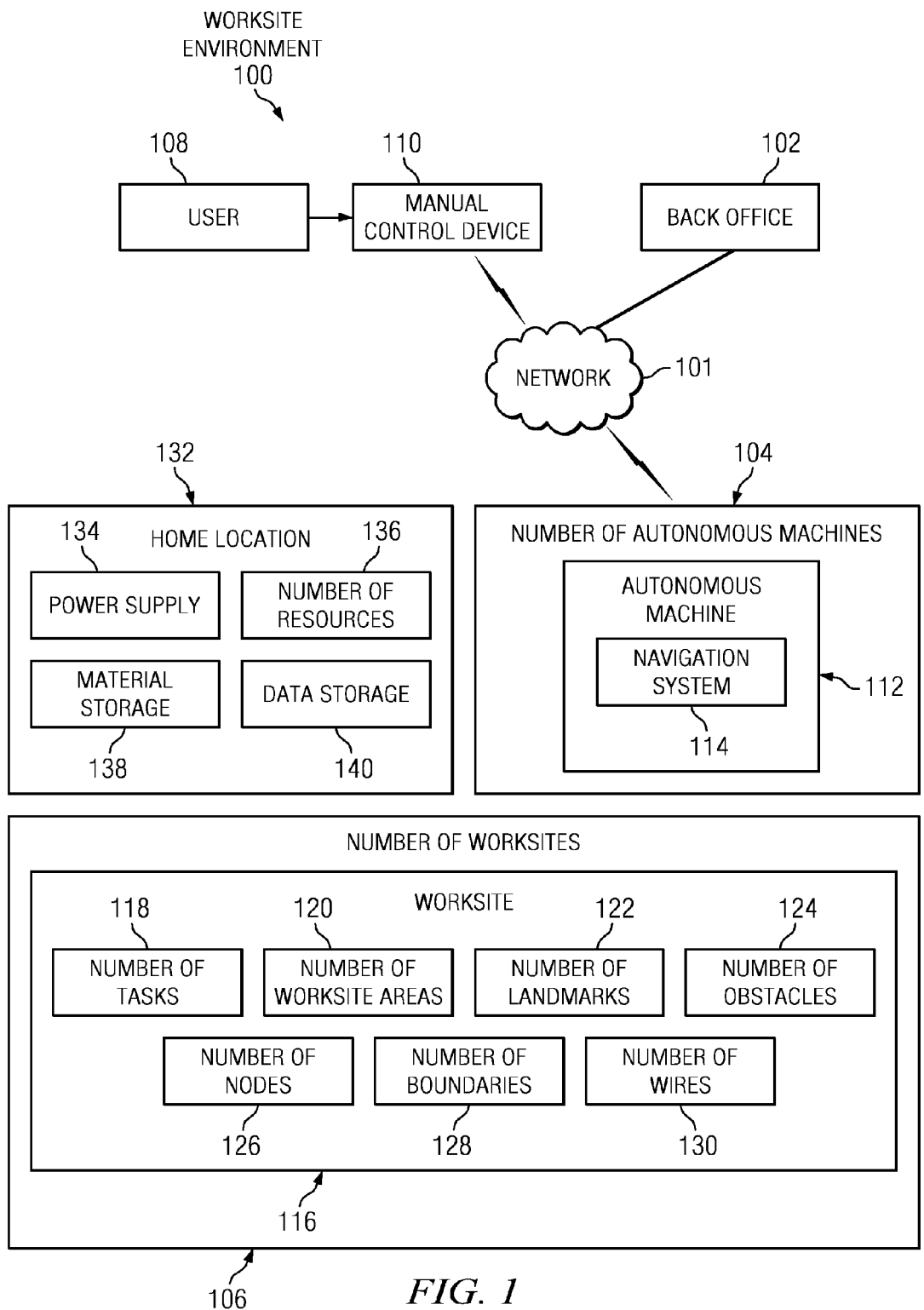
FIG. 1 is a block diagram of a worksite environment in which an illustrative embodiment may be implemented.

With reference to the figures and in particular with reference to FIG. 1, a block diagram of a worksite environment is depicted in which an illustrative embodiment may be implemented. Worksite environment 100 may be any type of worksite environment in which an autonomous machine can operate. In an illustrative example, worksite environment 100 may be a structure, building, worksite, area, yard, golf course, indoor environment, outdoor environment, and/or any other suitable worksite environment or combination of worksite environments.

Worksite environment 100 includes network 101 in one embodiment of the present invention. In this example, back office 102 may be a single computer or a distributed computing cloud. Back office 102 supports the physical databases and/or connections to external databases which may be used in the different illustrative embodiments. Back office 102 may supply databases to different machines, as well as provide online access to information from databases. Back office 102 may also provide path plans for vehicles and/or machines, such as number of autonomous machines 104, for example. Worksite environment 100 may include number of autonomous machines 104, number of worksites 106, user 108, and manual control device 110. As used herein, a number of items mean one or more items. For example, number of worksites 106 is one or more worksites.

An autonomous machine may be any type of machine that moves and performs tasks. Number of autonomous machines 104 may be any type of autonomous machine including, without limitation, a mobile robotic machine, a service robot, a field robot, a robotic mower, a robotic snow removal machine, a robotic leaf removal machine, a robotic lawn watering machine, a robotic vacuum, a robotic floor cleaner, a material gathering machine, a material application machine, a sensing machine, and/or any other autonomous machine. As used herein, autonomous machines include semi-autonomous machines which have an operator on-board or nearby to perform one or more functions. These functions may include, for example without limitation, one or more of guidance, safeguarding, diagnosis, task monitoring, task control, or data recording.

Autonomous machine 112 is an illustrative example of one implementation of an autonomous machine from number of autonomous machines 104. Autonomous machine 112 includes navigation system 114. Navigation system 114 provides a base system for controlling the mobility, positioning, and navigation for autonomous machine 112. Base system capabilities may include base behaviors such as, for example, without limitation, base mobility functions for effectuating random area coverage of a worksite and/or a number of worksite areas, base obstacle avoidance functions for contact switch obstacle avoidance, base dead reckoning for positioning functions, and/or any other combination of basic functionality for autonomous machine 112.

Number of worksites 106 may be any area within worksite environment 100 in which number of autonomous machines 104 can operate. Each worksite in number of worksites 106 may be associated with a number of tasks. Worksite 116 is an illustrative example of one worksite in number of worksites 106. For example, in an illustrative embodiment, worksite 116 may be a yard surrounding a residence of user 108. Worksite 116 includes number of tasks 118. In an illustrative example, number of tasks 118 may include mowing the yard of the residence of user 108. Number of tasks 118 may be any type of area coverage task including, without limitation, a service task, a field task, mowing, snow removal, leaf removal, lawn watering, vacuuming, cleaning, material gathering, material application, sensing, data collection, and/or any other type of task. Autonomous machine 112 may operate to perform number of tasks 118 within worksite 116. As used herein, number refers to one or more items. In one illustrative example, number of worksites 106 may include, without limitation, a primary yard and a secondary yard. The primary yard may be worksite 116, associated with number of tasks 118. The secondary yard may be associated with another set of tasks, for example. In one illustrative example, the secondary yard may be in the same geographical location as the primary yard, but with different sub-regions, or worksite areas, defined for a different set of tasks than number of tasks 118.

Each worksite in number of worksites 106 may include a number of worksite areas, a number of landmarks, a number of obstacles, a number of nodes, a number of wires, and/or a number of boundaries. Worksite 116 includes number of worksite areas 120, number of landmarks 122, number of obstacles 124, number of nodes 126, number of boundaries 128, and number of wires 130. In an illustrative example, number of worksite areas 120 may be a number of regions, or sub-areas, within worksite 116, such as, for example, without limitation, a first region, a second region, a third region, and so on.

Number of landmarks 122 may be any type of feature capable of being detected by number of autonomous machines 104 and used for identifying a location of a worksite and/or a location of autonomous machine 112 within a worksite, such as worksite 116. In an illustrative example, number of landmarks 122 may include, without limitation, artificial landmarks, natural landmarks, any combination of the foregoing, and/or any other suitable landmark. Artificial landmarks may include, for example, without limitation, fence posts. Natural landmarks may include, for example, without limitation, tree trunks. Other types of landmarks may include, for example, building architectural features, driveways, sidewalks, curbs, and/or any other suitable landmark.

Number of obstacles 124 may be any type of object that occupies a physical space within worksite 116 and/or a location that number of autonomous machines 104 should not occupy or cross. The types of objects that occupy a physical space within worksite 116 may refer to objects that may be damaged by or cause damage to number of autonomous machines 104 if they were to contact each other, particularly with non-zero speed, for example. The locations which number of autonomous machines 104 should not occupy or should not cross may be independent of what occupies that space or is on the other side of the boundary, for example.

Number of nodes 126 may be any type of object configured to define number of number of boundaries 128. A node is a point used in defining an area. A node may be one point of a line defining at least a portion of the boundary of an area. A node may alternately be a point in the interior of an area from which the boundary is calculated, such as the center of a circle with radius R.

In one illustrative embodiment, a node may be non-physical, such as a latitude and a longitude. In another illustrative embodiment, a node may be a physical object. Examples of physical nodes include without limitation, an infrared emitter, a radio frequency transmitter, a visible light emitter, a point on a signal emitting wire, a fixed object with an RFID tag or bar code, a fixed object with a known number of attributes such as color, diameter, shape, and pattern. In this invention, the preferred implementation of a node enables a precise boundary to be defined with a signal which carries information, such as the names of the nodes at each end of the given portion of the boundary.

In an illustrative example, number of nodes 126 may be plastic spikes with a base processing unit, inputs, and outputs for receiving and transmitting signals to define number of boundaries 128. The signals may include, for example, without limitation, wired signals, infrared signals, electrical signals, optical signals, laser signals, microwave signals, radio frequency identification signals, and/or any other suitable signal. In one illustrative embodiment, number of wires 130 may connect number of nodes 126 at the inputs and outputs of number of nodes 126. Number of wires 130 may conduct the signals used to identify number of nodes 126 and define number of boundaries 128, for example. In one illustrative example, number of nodes 126 may be implemented in pairs, where each paired set of nodes mark portals where number of autonomous machines 104 may cross between number of worksite areas 120. In some illustrative embodiments, number of worksite areas 120 may not be physically adjacent to each other, and number of nodes 126 may be used to guide number of autonomous machines 104 from one worksite area to another worksite area across an obstacle, such as a sidewalk or driveway for example.

In another illustrative example, number of boundaries 128 may be defined by a number of geo-referenced locations connected by a mathematically calculated line. In yet another illustrative example, number of boundaries 128 may be defined by a number of points and a defined distance from each point. In yet another illustrative example, number of boundaries 128 may be defined by a change in surface attribute or soil attribute. Surface attributes may include, for example, without limitation, water depth, ice depth, and vegetative cover or lack thereof. Soil attributes may include, for example, without limitation, soil type, soil moisture content, soil mechanical resistance, soil density, and soil electrical conductivity.

In still another illustrative example, number of boundaries 128 may be defined by an environmental attribute such as proximity to people, proximity to wildlife, and shade or sunlight.

User 108 may be, without limitation, a human operator, a robotic operator, or some other external system. Manual control device 110 may be any type of manual controller, which allows user 108 to override autonomous behaviors and control number of autonomous machines 104. In an illustrative example, user 108 may use manual control device 110 to control movement of number of autonomous machines 104 from home location 132 to worksite 116 in order to perform number of tasks 118.

Home location 132 may be a docking station or storage station for number of autonomous machines 104. Home location 132 may include power supply 134, number of resources 136, material storage 138, data storage 140, any combination of the foregoing, and/or any other suitable component. Power supply 134 may provide power to number of autonomous machines 104 when number of autonomous machines 104 is at home location 132. In an illustrative example, power supply 134 may recharge a power store or power supply of number of autonomous machines 104. Power supply 134 may include, without limitation, a battery, mobile battery re-charger, ultra-capacitor, fuel cell, gas powered generator, photo cells, and/or any other suitable power source.

Number of resources 136 may be any type of resource or material capable of being distributed and/or applied across number of worksites 106 by number of autonomous machines 104. In one illustrative embodiment, number of resources 136 may include, for example, without limitation, water, fertilizer, plant nutrients, pest control chemicals, plant seed, and/or any other suitable resources. Number of resources 136 may be related to the number of tasks associated with a worksite, such as number of tasks 118 for worksite 116, for example.

Material storage 138 may be any type of storage for a material and/or element collected by number of autonomous machines 104 throughout number of worksites 106. In one illustrative embodiment, material storage 138 may be used to collect lawn clippings, plant clippings, ground cover, soil, debris, and/or any other suitable material. Material storage 138 may be related to the number of tasks associated with a worksite, such as number of tasks 118 for worksite 116, for example.

Data storage 140 may be used to collect and store data collected by number of autonomous machines 104 during operation in worksite environment 100. In an illustrative example, number of autonomous machines 104 may collect sensor data during operation within number of worksites 106. Number of autonomous machines 104 may have limited data storage capacity, and may transfer stored data to data storage 140 when number of autonomous machines is at home location 132 in order to free up space for additional collection of data on number of autonomous machines 104, for example.

The illustration of worksite environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one illustrative embodiment, number of nodes 126 may be implemented throughout worksite 116 without the use of number of wires 130. In another illustrative embodiment, number of boundaries 128 may be defined without use of number of nodes 126. In yet another illustrative example, data storage 140 may be implemented on number of autonomous machines 104 and configured for wireless data transfer between number of autonomous machines 104 and home location 132.

The different illustrative embodiments recognize and take into account that currently used methods for robotic navigation often use a very primitive, random navigation system. This random navigation system works within a perimeter established by a wire carrying an electrical signal. The robotic machines in currently used methods may be equipped with an electrical signal detector and a bumper switch on the body of the machine. These machines move in a generally straight direction until they either detect the signal from the perimeter wire, or a bumper switch is closed due to contact of the machine with an external object. When either of these two situations occurs, these machines change direction. In this way, current methods constrain the machine within a work area perimeter and maintain movement after contact with external objects.

The different illustrative embodiments further recognize and take into account that currently used methods for robotic navigation raise concerns for consumers when considering whether to move from manned to unmanned machines. Consumers may wonder if the lower cost, yet random coverage ability of some machines will meet aesthetic standards for the machine task. Another concern may be the capability of a machine to work adequately in multiple areas of a worksite. Still another concern may be the ability of an unmanned machine to efficiently and effectively cover multiple areas of a worksite without manual guidance by a human operator between the different areas of the worksite.

Thus, the different illustrative embodiments provide a system for autonomous machine management comprising a number of autonomous machines, a number of nodes, a performance estimation module, and a navigation system. The number of autonomous machines is configured to perform area coverage tasks in a worksite. The number of nodes is configured to define a number of worksite areas for the worksite. The performance estimation module is executed by a processor unit and configured to calculate a percentage of work completed in the number of worksite areas. The navigation system is configured to operate an autonomous machine to perform the area coverage tasks and move between the number of worksite areas.

The different illustrative embodiments further provide a boundary node comprising a power source, a number of inputs, a number of outputs, and a processor unit. The processor unit is configured to receive a number of signals from the number of inputs and transmit the number of signals using the number of outputs.

The different illustrative embodiments further provide a method for managing autonomous machines. A number of worksite areas is identified for a worksite. An area coverage task is performed in a first worksite area using an autonomous machine. A percentage of work completed for the first worksite area is calculated by the autonomous machine to form a calculated value. A determination is made as to whether a threshold value is met using the calculated value. In response to a determination that the threshold value is met, the autonomous machine is moved to a next worksite area.

Figure 2:
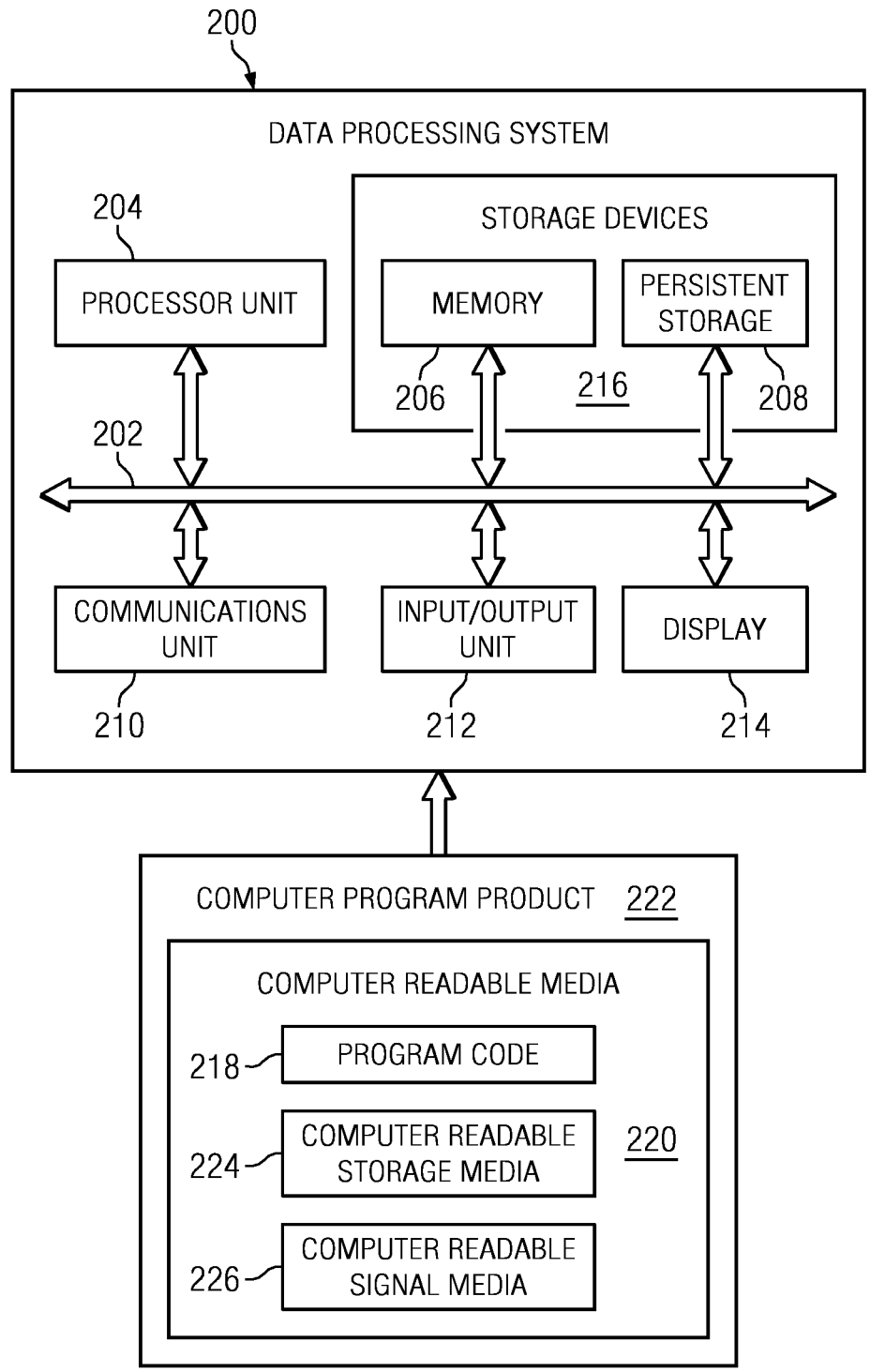
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a computer, such as back office 102 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. A number as used herein with reference to an item means one or more items. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive that is part of persistent storage 208. Computer readable storage medium 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage medium 224 is a non-transitory computer readable storage medium.

Alternatively, program code 218 may be transferred to data processing system 200 from computer readable media 220 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
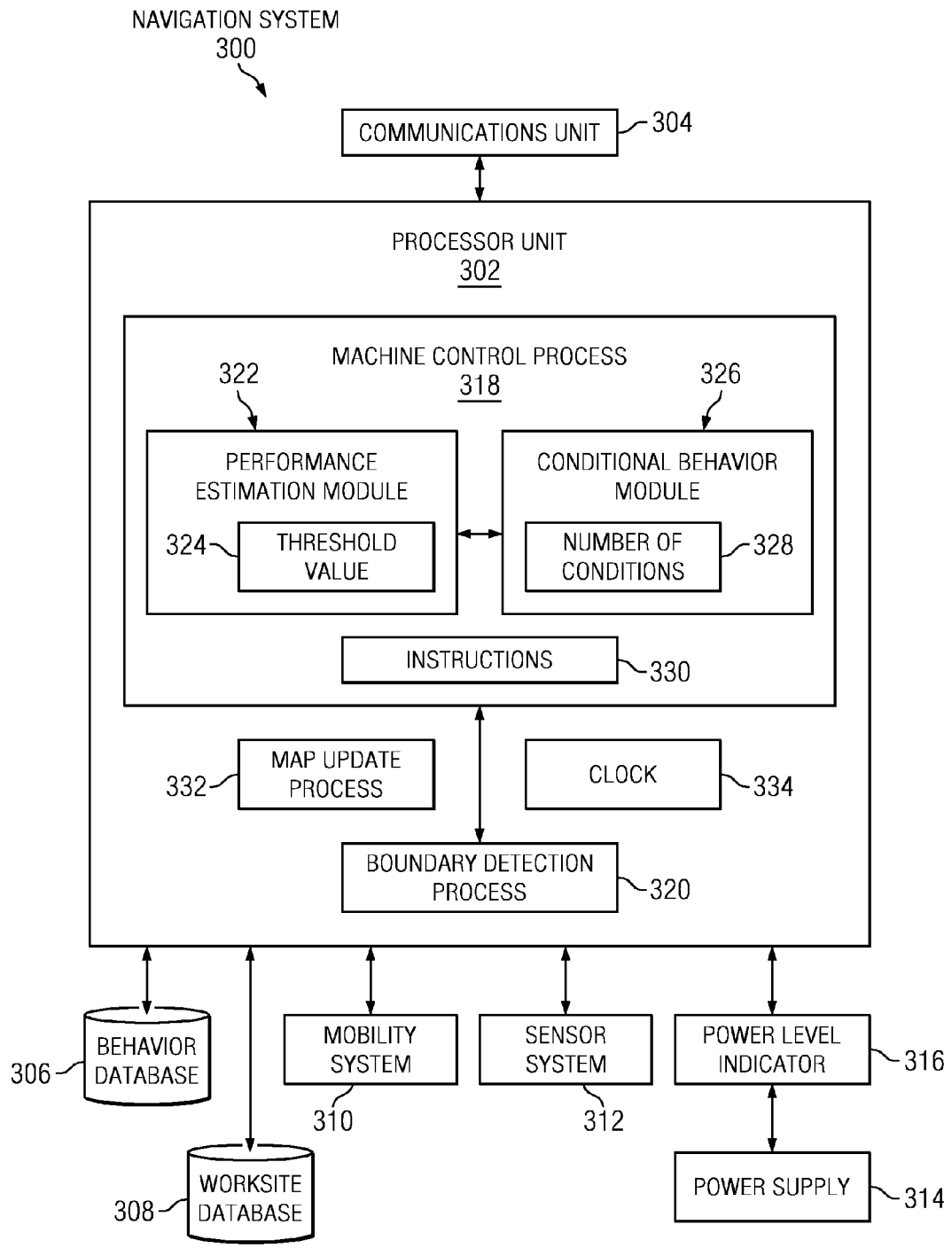
FIG. 3 is a block diagram of a navigation system in accordance with an illustrative embodiment.

With reference now to FIG. 3, a block diagram of a navigation system is depicted in accordance with an illustrative embodiment. Navigation system 300 is an example of one implementation of navigation system 114 in FIG. 1.

Navigation system 300 includes processor unit 302, communications unit 304, behavior database 306, worksite database 308, mobility system 310, sensor system 312, power supply 314, and power level indicator 316. Processor unit 302 may be an example of one implementation of data processing system 200 in FIG. 2. Processor unit 302 includes machine control process 318, boundary detection process 320, map update process 332, and clock 334. Machine control process 318 is configured to communicate with and control mobility system 310. Boundary detection process 320 is configured to receive data from sensor system 312 and send boundary information to machine control process 318. Machine control process 318 receives boundary information detected from sensor system 312 and uses the boundary information along with information from behavior database 306 and worksite database 308 to generate instructions 330 for mobility system 310 to operate an autonomous machine.

Machine control process 318 includes performance estimation module 322 and conditional behavior module 326. Performance estimation module 322 may use information from behavior database 306, worksite database 308, and boundary detection process 320 to generate instructions 330, in an illustrative example. Performance estimation module 322 includes threshold value 324. Threshold value 324 is a pre-determined value associated with a desired percentage of work completed for a worksite area, in an illustrative example.

The threshold value may be defined in terms of a percentage of area covered within the worksite in performance of a task or alternately, it may be defined as a percentage of the task to be completed in the area. For example, in a lawn mowing task, the desired percentage of grassy area coverage may be equal to the area to be covered in the mowing task. For that same grassy area and a leaf collection task, the area needed to be covered for the task may be less than the total area. In the mowing task, the threshold may be a percentage of the total area, whereas in the leaf gathering task, the threshold may be in terms of area still containing leaves. If the initial area containing leaves is less than the total area, not all areas in the work area need to be covered for the area coverage task to be completed.

In an illustrative example of an autonomous mower with an inaccurate dead reckoning positioning system, the completion threshold value may be set at some value less than 100% of estimated area covered if it is unlikely the mower would reach 100% in an acceptable time. In another illustrative example, if the dead reckoning system consisted of only an odometer, the threshold may be set at a value greater than 100% of the minimum distance traveled needed to cover the area if the positioning system was precise.

Threshold value 324 may be configured by a user, such as user 108 in FIG. 1, in one illustrative embodiment. In another illustrative embodiment, threshold value 324 may be configured by a remote system, such as back office 102 in FIG. 1, for example.

In an illustrative example, performance estimation module 322 may generate instructions for an autonomous machine to remain in a current worksite area if threshold value 324 has not been met. In another illustrative example, performance estimation module 322 may generate instructions 330 to operate mobility system 310 to move an autonomous machine into a next worksite area when threshold value 324 has been met. Instructions 330 may include a path for a worksite, a path between a number of worksite areas, and/or any other suitable instructions, for example. A path may be any length, for example one foot or ten feet, and may change as the position of the autonomous machine relative to a landmark, obstacle, node, and/or boundary changes.

Machine control process 318 may also include conditional behavior module 326. Conditional behavior module 326 may use information from behavior database 306, worksite database 308, and boundary detection process 320 to generate instructions 330, in an illustrative example. Conditional behavior module 326 includes number of conditions 328. Number of conditions 328 may include at least one of, for example, without limitation, whether there is work to be performed in a worksite area, whether an autonomous machine has adequate power supply to work in a worksite area, whether an autonomous machine has adequate supply of materials to work in a worksite area, whether an autonomous machine has adequate storage capacity to work in a worksite area, whether there is a higher priority activity requiring the exclusion of an autonomous machine from a worksite area, whether entry into a worksite area allows an autonomous machine to reach a destination, whether a worksite area is a current excludable area, and/or any other suitable condition. As used herein, number of conditions refers to one or more conditions.

In an illustrative example, conditional behavior module 326 may generate instructions 330 for an autonomous machine to remain in a current worksite area if number of conditions 328 has not been met. In another illustrative example, conditional behavior module 326 may generate instructions 330 to operate mobility system 310 to move an autonomous machine into a next worksite area when number of conditions 328 has been met.

Machine control process 318 may retrieve a worksite map from worksite database 308 in order to generate instructions, such as instructions 330, for an autonomous machine to execute within a worksite. A worksite map is a map that identifies a worksite, such as worksite 116 in FIG. 1, for example. A worksite map may be used to identify a location for an area coverage task and plan a path for execution of the area coverage task on a worksite. The worksite map may have a number of nodes identified in this example. Machine control process 318 may use instructions 330 to send commands and/or signals to mobility system 310 in order to move an autonomous machine associated with navigation system 300 according to instructions 330. Machine control process 318 may initiate an area coverage task using instructions 330 in response to a trigger, such as, for example, without limitation, a button being selected on an autonomous machine, a command from a manual control device, a software-driven event, a time-driven event, a signal emitted from a node, and/or any other suitable trigger.

Performance estimation module 322 calculates a percentage of work performed in each worksite area, such as number of worksite areas 120 in FIG. 1, by an autonomous machine, such as autonomous machine 112 in FIG. 1, for example. The percentage of work may be calculated based on at least one of a percentage of area covered by the autonomous machine relative to the total area of a worksite area, an amount of time spent in the worksite area, an amount of energy expended in the worksite area, an amount of material applied in the worksite area, the amount of material gathered in the worksite area, and/or any other suitable parameter.

Processor unit 302 may also include map update process 332. Map update process 332 may use information collected by sensor system 312 throughout a worksite to update worksite maps accessed and stored in worksite database 308, for example. Sensor system 312 collects sensor data during operation of the autonomous machine associated with navigation system 300 throughout a worksite, such as worksite 116 in FIG. 1, for example. Sensor information may include node locations, distance between nodes, relative locations of nodes and landmarks or other obstacles, surface conditions, soil conditions, and/or any other suitable information. A worksite map used by machine control process 318 for initial instructions 330 may be updated by map update process 332 as sensor data from sensor system 312 is received by processor unit 302. The updated map topologies may be saved to worksite database 308, for example, for future use, refining the efficiency of future area coverage tasks within a worksite.

Worksite database 308 may be consulted by map update process 332 to identify locations in a worksite, such as worksite 116 in FIG. 1, which are likely to have attributes comparable to those at the sensed location. In an illustrative example, if excessive standing water is detected at a given sensed location, regions adjacent to the sensed location with equal or lower elevation are likely to also have standing water. The total region with excessive standing water may be estimated along with its boundary. This area may be marked as an excludable area until the standing water is gone, in this illustrative example.

Processor unit 302 may also include clock 334. Clock 334 may be any type of timing device used to trigger scheduled events, time-driven events, and/or any other suitable time-dependent event. Clock 334 may be used by conditional behavior module 326 to determine whether number of conditions 328 is met, in one illustrative example. For example, number of conditions 328 may include a time-specific excludable worksite area, which may be identified using boundary detection process 320 during operation of an autonomous machine associated with navigation system 300. In this illustrative example, determination of whether number of conditions 328 is met may be based in part on clock 334.

In one illustrative example, a worksite area, such as number of worksite areas 120 in FIG. 1, is not to contain an autonomous mower between 5:00 PM and 10:00 PM on a Saturday because people will be using the worksite area for a social gathering. The autonomous mower may operate elsewhere within worksite 116 during this time, in this illustrative example.

In another illustrative example, an autonomous mower is not to operate within fifty feet of a birds nest between May 9 and May 15 of a given year and then only between the hours of 11:00 AM and 3:00 PM for a total of one hour per day from May 16 to June 15.

Processor unit 302 may further communicate with and access data stored in behavior database 306 and worksite database 308. Accessing data may include any process for storing, retrieving, and/or acting on data in behavior database 306 and/or worksite database 308. For example, accessing data may include, without limitation, using a lookup table housed in behavior database 306 and/or worksite database 308, running a query process using behavior database 306 and/or worksite database 308, and/or any other suitable process for accessing data stored in a database.

Processor unit 302 receives information from sensor system 312 and may use sensor information in conjunction with behavior data from behavior database 306 when controlling mobility system 310. Processor unit 302 may also receive control signals from an outside controller, such as manual control device 110 operated by user 108 in FIG. 1, for example. These control signals may be received by processor unit 302 using communications unit 304.

Communications unit 304 may provide communication links to processor unit 302 to receive information. This information includes, for example, data, commands, and/or instructions. Communications unit 304 may take various forms. For example, communications unit 304 may include a wireless communications system, such as a cellular phone system, a Wi-Fi wireless system, or some other suitable wireless communications system.

Communications unit 304 may also include a wired connection to an optional manual controller, such as manual control device 110 in FIG. 1, for example. Further, communications unit 304 also may include a communications port, such as, for example, a universal serial bus port, a serial interface, a parallel port interface, a network interface, or some other suitable port to provide a physical communications link. Communications unit 304 may be used to communicate with an external control device or user, for example.

In one illustrative example, processor unit 302 may receive control signals from manual control device 110 operated by user 108 in FIG. 1. These control signals may override autonomous behaviors of machine control process 318 and allow user 108 in FIG. 1 to stop, start, steer, and/or otherwise control the autonomous machine associated with navigation system 300.

Behavior database 306 contains a number of behavioral actions which machine control process 318 may utilize when controlling mobility system 310. Behavior database 306 may include, without limitation, basic machine behaviors, area coverage behaviors, boundary behaviors, obstacle avoidance behaviors, manual control behaviors, power supply behaviors, and/or any other suitable behaviors for an autonomous machine.

Mobility system 310 provides mobility for an autonomous machine, such as autonomous machine 112 in FIG. 1. Mobility system 310 may take various forms. Mobility system 310 may include, for example, without limitation, a propulsion system, steering system, braking system, and mobility components. In these examples, mobility system 310 may receive commands from machine control process 318 and move an associated autonomous machine in response to those commands.

Sensor system 312 may include a number of sensor systems for collecting and transmitting sensor data to processor unit 302. For example, sensor system 312 may include, without limitation, a dead reckoning system, a global satellite navigation receiver, an obstacle detection system, a boundary detection system, and/or some other suitable type of sensor system, as shown in more illustrative detail in FIG. 5. Sensor data is information collected by sensor system 312.

Power supply 314 provides power to components of navigation system 300 and the associated autonomous machine, such as autonomous machine 112 in FIG. 1, for example. Power supply 314 may include, without limitation, a battery, mobile battery re-charger, ultra-capacitor, fuel cell, gas powered generator, photo cells, and/or any other suitable power source. Power level indicator 316 monitors the level of power supply 314 and communicates the power supply level to processor unit 302. In an illustrative example, power level indicator 316 may send information about a low level of power in power supply 314. Processor unit 302 may access behavior database 306 to employ a behavioral action in response to the indication of a low power level, in this illustrative example. For example, without limitation, a behavioral action may be to cease operation of a task and seek a recharging station in response to the detection of a low power level.

The illustration of navigation system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, processor unit 302 may be implemented with one or more of the illustrative components, and access the remaining components remotely using communications unit 304. In another illustrative embodiment, behavior database 306 and worksite database 308 may be implemented remotely from navigation system 300 and accessed by processor unit 302 over communications unit 304, for example.

Figure 4:
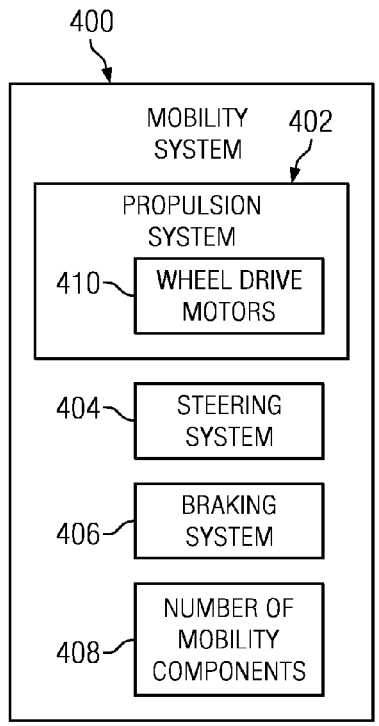
FIG. 4 is a block diagram of a mobility system in accordance with an illustrative embodiment.

With reference now to FIG. 4, a block diagram of a mobility system is depicted in accordance with an illustrative embodiment. Mobility system 400 is an example of one implementation of mobility system 310 in FIG. 3.

Mobility system 400 provides mobility for autonomous machines associated with a navigation system, such as navigation system 300 in FIG. 3. Mobility system 400 may take various forms. Mobility system 400 may include, for example, without limitation, propulsion system 402, steering system 404, braking system 406, and number of mobility components 408. In these examples, propulsion system 402 may propel or move an autonomous machine, such as autonomous machine 112 in FIG. 1, in response to commands from a navigation system, such as navigation system 300 in FIG. 3.

Propulsion system 402 may maintain or increase the speed at which an autonomous machine moves in response to instructions received from a processor unit of a navigation system. Propulsion system 402 may be an electrically controlled propulsion system. Propulsion system 402 may be, for example, without limitation, an internal combustion engine, an internal combustion engine/electric hybrid system, an electric engine, or some other suitable propulsion system. In an illustrative example, propulsion system 402 may include wheel drive motors 410. Wheel drive motors 410 may be an electric motor incorporated into a mobility component, such as a wheel, that drives the mobility component directly. In one illustrative embodiment, steering may be accomplished by differentially controlling wheel drive motors 410.

Steering system 404 controls the direction or steering of an autonomous machine in response to commands received from a processor unit of a navigation system. Steering system 404 may be, for example, without limitation, an electrically controlled hydraulic steering system, an electrically driven rack and pinion steering system, a differential steering system, or some other suitable steering system. In an illustrative example, steering system 404 may include a dedicated wheel configured to control number of mobility components 408.

Braking system 406 may slow down and/or stop an autonomous machine in response to commands received from a processor unit of a navigation system. Braking system 406 may be an electrically controlled braking system. This braking system may be, for example, without limitation, a hydraulic braking system, a friction braking system, a regenerative braking system using wheel drive motors 410, or some other suitable braking system that may be electrically controlled. In one illustrative embodiment, a navigation system may receive commands from an external controller, such as manual control device 110 in FIG. 1, to activate an emergency stop. The navigation system may send commands to mobility system 400 to control braking system 406 to perform the emergency stop, in this illustrative example.

Number of mobility components 408 provides autonomous machines with the capability to move in a number of directions and/or locations in response to instructions received from a processor unit of a navigation system and executed by propulsion system 402, steering system 404, and braking system 406. Number of mobility components 408 may be, for example, without limitation, wheels, tracks, feet, rotors, propellers, wings, and/or other suitable components.

The illustration of mobility system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
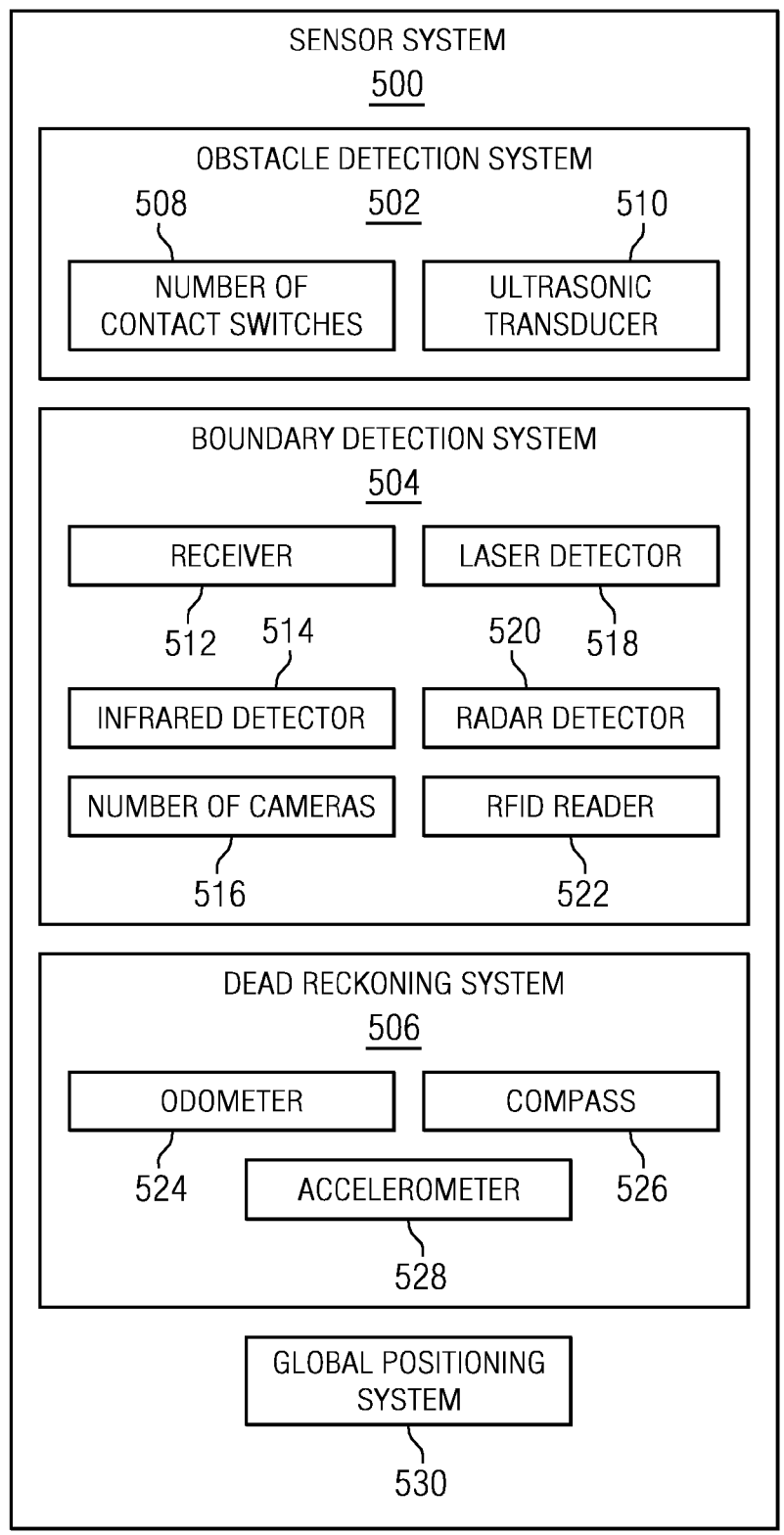
FIG. 5 is a block diagram of a sensor system in accordance with an illustrative embodiment.

With reference now to FIG. 5, a block diagram of a sensor system is depicted in accordance with an illustrative embodiment. Sensor system 500 is an example of one implementation of sensor system 312 in FIG. 3.

Sensor system 500 includes a number of sensor systems for collecting and transmitting sensor data to a processor unit of a navigation system, such as navigation system 300 in FIG. 3. Sensor system 500 may include obstacle detection system 502, boundary detection system 504, dead reckoning system 506, and global positioning system 530.

Obstacle detection system 502 may include, without limitation, number of contact switches 508 and ultrasonic transducer 510. Number of contact switches 508 detects contact by an autonomous machine with an external object in the environment, such as worksite environment 100 in FIG. 1, for example. Number of contact switches 508 may include, for example, without limitation, bumper switches. Ultrasonic transducer 510 generates high frequency sound waves and evaluates the echo received back. Ultrasonic transducer 510 calculates the time interval between sending the signal, or high frequency sound waves, and receiving the echo to determine the distance to an object.

Boundary detection system 504 detects a perimeter or boundary of a worksite, such as worksite 116 in FIG. 1, and sends information about the boundary detection to a processor unit of a navigation system. Boundary detection system 504 may include, without limitation, receiver 512, infrared detector 514, number of cameras 516, laser detector 518, radar detector 520, radio frequency identification (RFID) reader 522, and/or any other suitable boundary detection component. Receiver 512 detects electrical signals, which may be emitted by a wire delineating the boundary of a worksite, such as worksite 116 in FIG. 1, or the boundaries of a number of worksite areas, such as number of worksite areas 120 in FIG. 1, for example. In one illustrative example, receiver 512 may detect signals from number of wires 130 between number of nodes 126 in FIG. 1.

Infrared detector 514 detects infrared light, which may be emitted by an infrared light source along the boundary of a worksite or number of worksite areas. In an illustrative example, number of nodes 126 in FIG. 1 may emit infrared light. Infrared light may be emitted in a constant beam, a patterned beam, pulsed beam, at pre-determined times, in response to detection of an autonomous vehicle by a node, and/or any other suitable trigger, for example.

Number of cameras 516 may include, for example, without limitation, a color camera, a black and white camera, a digital camera, an infrared camera, and/or any other suitable camera. In one illustrative example, number of cameras 516 may be oriented to capture a view that is down and horizontal relative to the autonomous machine associated with navigation system 300, such as autonomous machine 112 in FIG. 1, for example. In this illustrative example, the orientation of number of cameras 516 may enable autonomous machine behaviors, such as boundary following, for example. In an illustrative example where number of cameras 516 includes a color camera, boundary following behaviors may use number of cameras 516 to identify a color boundary, such as green grass contrasted with a concrete curb, for example. In another illustrative example, number of cameras 516 may be oriented to capture a view facing perpendicular to the direction of travel of the autonomous machine associated with navigation system 300, such as autonomous machine 112 in FIG. 1, for example.

In an illustrative example, receiver 512 may detect an electrical signal from a boundary wire between a node pair and send information about that detected signal to a processor unit of a navigation system, such as navigation system 300 in FIG. 3. The navigation system may then send commands to a mobility system, such as mobility system 400 in FIG. 4, to alter the direction or course of an autonomous machine associated with the navigation system, in this illustrative example.

Dead reckoning system 506 estimates the current position of an autonomous machine associated with the navigation system. Dead reckoning system 506 estimates the current position based on a previously determined position and information about the known or estimated speed over elapsed time and course. Dead reckoning system 506 may include, without limitation, odometer 524, compass 526, and accelerometer 528. Odometer 524 is an electronic or mechanical device used to indicate distance traveled by a machine, such as autonomous machine 112 in FIG. 1. Compass 526 is a device used to determine position or direction relative to the Earth's magnetic poles. Accelerometer 528 measures the change in velocity it experiences in one or more dimensions.

Sensor system 500 may also include global positioning system 530. Global positioning system 530 may identify the location of an autonomous machine with respect to other objects in the environment. Global positioning system 530 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionispheric conditions, satellite constellation, and signal attenuation from vegetation.

The illustration of sensor system 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
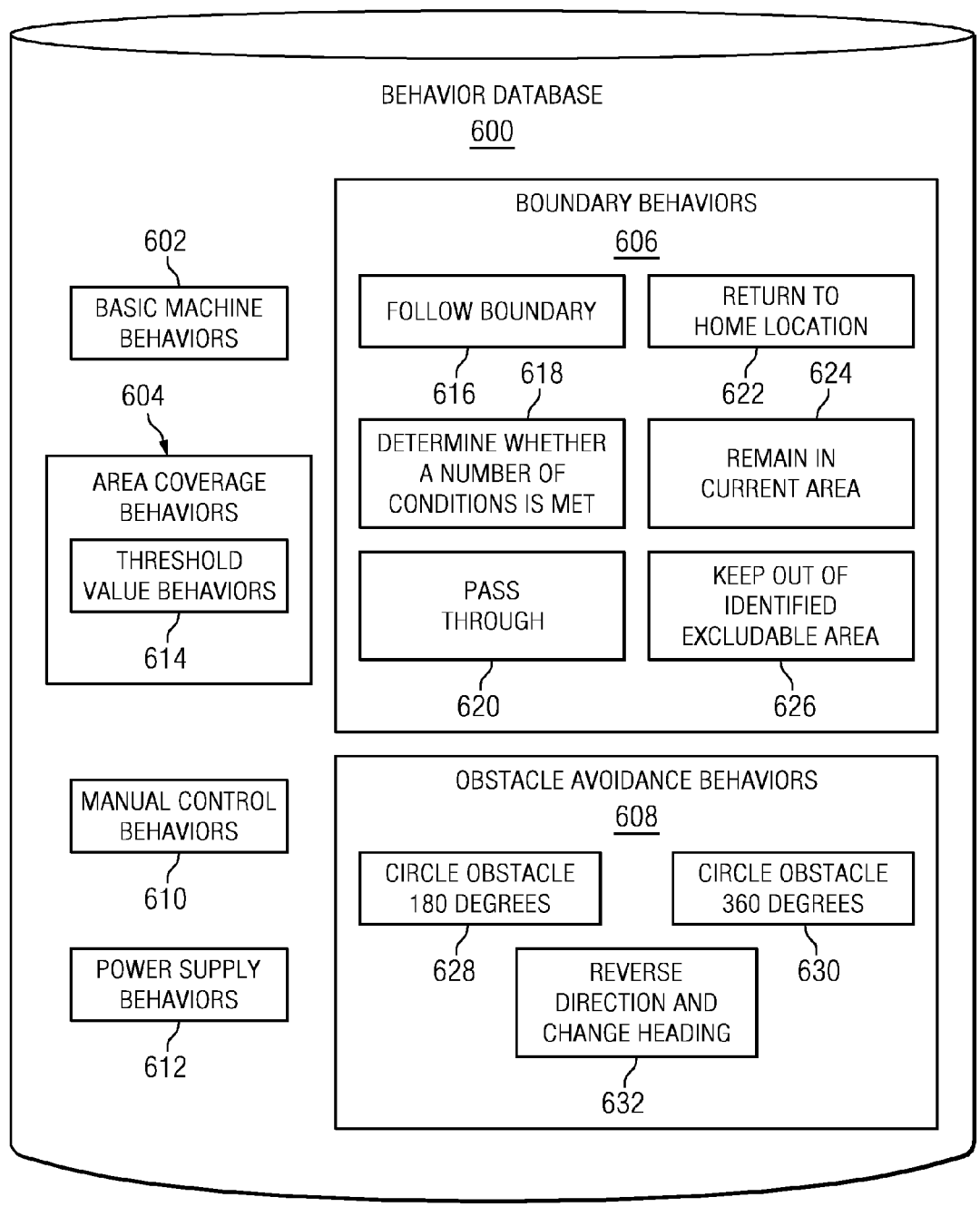
FIG. 6 is a block diagram of a behavior database in accordance with an illustrative embodiment.

With reference now to FIG. 6, a block diagram of a behavior database is depicted in accordance with an illustrative embodiment. Behavior database 600 is an example of one implementation of behavior database 306 in FIG. 3.

Behavior database 600 includes a number of behavioral actions machine control process 318 of navigation system 300 may utilize when controlling mobility system 310 in FIG. 3. Behavior database 600 may include, without limitation, basic machine behaviors 602, area coverage behaviors 604, boundary behaviors 606, obstacle avoidance behaviors 608, manual control behaviors 610, power supply behaviors 612, and/or any other suitable behaviors for an autonomous machine.

Basic machine behaviors 602 provide actions for a number of basic tasks an autonomous machine may perform. Basic machine behaviors 602 may include, without limitation, mowing, vacuuming, floor scrubbing, cleaning, material application, material collection, leaf removal, snow removal, watering, spraying, security, and/or any other suitable task.

Area coverage behaviors 604 provide actions for area coverage when performing basic machine behaviors 602. Area coverage behaviors 604 may include, without limitation, threshold value behaviors 614. Threshold value behaviors 614 may include a number of behaviors corresponding to a number of threshold values. The number of threshold values may be a number of set values for area coverage completion that provide a baseline for performance estimation module 322 in determining when an autonomous machine has completed a set of tasks in a worksite area.

Boundary behaviors 606 provide actions for a navigation system in response to boundary detection, such as by boundary detection system 504 in FIG. 5. In an illustrative example, boundary behaviors 606 may include, without limitation, follow boundary 616, determine whether a number of conditions is met 618, pass through 620, return to home location 622, remain in current area 624, keep out of identified excludable area 626, and/or any other suitable behaviors. Follow boundary 616 may operate to move an autonomous machine parallel to a boundary for a predefined distance. A predefined distance may be, for example, a distance equal to the width of the autonomous machine less an error amount.

Determine whether a number of conditions is met 618 may trigger performance estimation module 322 in FIG. 3 to analyze area completion percentages, resource supply, power supply, storage capacity, and/or any other component in order to determine whether an autonomous machine can leave one worksite area for another worksite area. Pass through 620 may operate to move an autonomous machine through a node portal from one worksite area to another worksite area. A node portal may be, for example, a node pair implemented together to transmit a signal indicating a worksite area boundary. Return to home location 622 may operate to move an autonomous machine from a current location to the home location for a number of operations. The number of operations may include, for example, without limitation, re-charging power supply, resource replenishment, material drop-off, emptying storage, and/or any other suitable operation at a home location.

Remain in current area 624 may operate to maintain an autonomous machine operation in a current worksite area until a number of conditions are met for moving to another worksite area, for example. Keep out of identified excludable area 626 may trigger conditional behavior module 326 in FIG. 3 to analyze a number of conditions in order to determine whether an autonomous machine can leave one worksite area for another worksite area.

Obstacle avoidance behaviors 608 provide actions for a navigation system to avoid collision with objects in an environment around an autonomous machine. In an illustrative example, obstacle avoidance behaviors 608 may include, without limitation, circle obstacle 180 degrees 628, circle obstacle 360 degrees 630, reverse direction and change heading 632, and/or any other suitable behaviors. Circle obstacle 180 degrees 628 may operate to direct an autonomous machine half way around an obstacle to continue in a second direction opposite the first direction, for example. Circle obstacle 360 degrees 630 may operate to direct an autonomous machine around the entirety of an obstacle in order to perform a task on all areas around the obstacle, for example. Reverse direction and change heading 632 may operate to reverse direction and change heading of an autonomous machine to avoid an object detected by an obstacle detection system, such as obstacle detection system 502 in FIG. 5.

Manual control behaviors 610 provide actions for a navigation system to disable autonomy and take motion control from a user, such as user 108 in FIG. 1, for example. Power supply behaviors 612 provide actions for a navigation system to take a number of actions in response to a detected level of power in a power supply, such as power supply 314 in FIG. 3. In an illustrative example, power supply behaviors 612 may include, without limitation, stopping the task operation of an autonomous machine and seeking out additional power or power recharge for the autonomous machine.

The illustration of behavior database 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
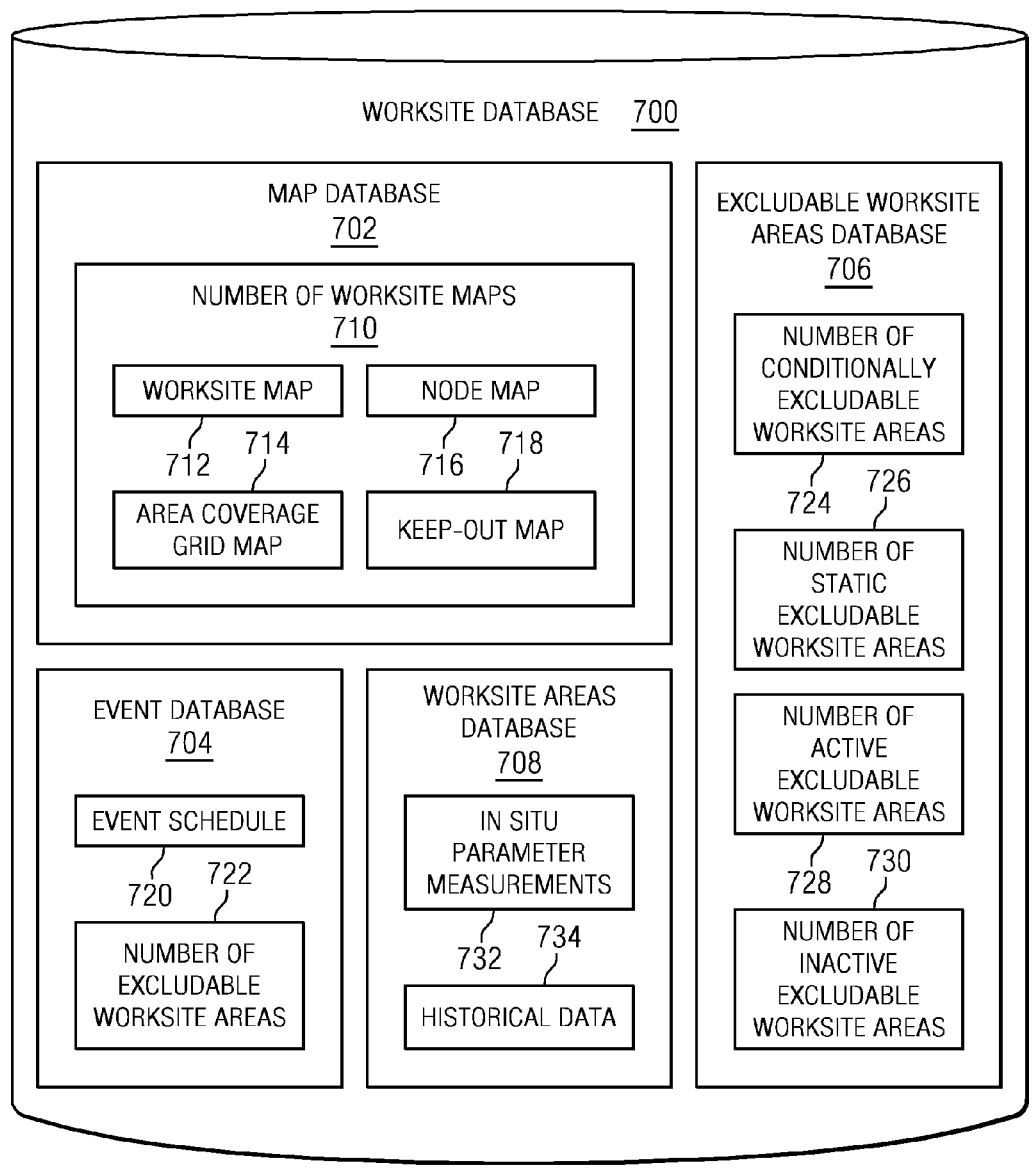
FIG. 7 is a block diagram of a worksite database in accordance with an illustrative embodiment.

With reference now to FIG. 7, a block diagram of a worksite database is depicted in accordance with an illustrative embodiment. Worksite database 700 is an example of one implementation of worksite database 308 in FIG. 3.

Worksite database 700 includes a number of databases processor unit 302 of navigation system 300 may utilize when generating instructions 330 and/or controlling mobility system 310 in FIG. 3. Worksite database 700 may include, without limitation, map database 702, event database 704, excludable worksite areas database 706, worksite areas database 708, and/or any other suitable database of information for an autonomous machine.

Map database 702 includes number of worksite maps 710. Number of worksite maps 710 may correspond to number of worksites 106 in FIG. 1, for example. In one illustrative embodiment, number of worksite maps 710 may be loaded into map database 702 from a remote location, such as back office 102 in FIG. 1 using network 101. In another illustrative embodiment, number of worksite maps 710 may be stored in map database 702 after being updated by map update process 332 in FIG. 3. In yet another illustrative embodiment, number of worksite maps 710 may be loaded into map database 702 by a user, such as user 108 in FIG. 1 using communications unit 304 in FIG. 3, for example. In an illustrative example, map update process 332 in FIG. 3 may update a worksite map during an initial operation in a worksite, and store the worksite map generated in map database 702 for later use in a future operation in the same worksite.

Number of worksite maps 710 may include, for example, without limitation, worksite map 712, area coverage grid map 714, node map 716, keep-out map 718, and/or any other suitable worksite map. Worksite map 712 may be an a priori map stored in number of worksite maps 710, which includes landmark locations and obstacle information for a worksite, such as worksite 116 in FIG. 1, for example. Worksite map 712 may be generated by a user, such as user 108 in FIG. 1 for example, identifying landmark locations and obstacles for a worksite on a map and/or image of the worksite. In an illustrative example, worksite map 712 may be used by number of autonomous machines 104 in FIG. 1 to perform an area coverage task for a number of worksite areas, taking into account the landmarks and obstacles for the worksite.

Area coverage grid map 714 may be, for example, without limitation, a worksite map including an area coverage grid overlay, a worksite image including an area coverage grid overlay, an area coverage grid for a bounded space and/or worksite dimensions, and/or any other suitable area coverage grid map.

Node map 716 may be, for example, without limitation, a node topography map or a node topology map for a worksite area. In an illustrative example, node map 716 may overlay worksite map 712 to provide basic node topography for a worksite. Node map 716 may be updated by map update process 332 in FIG. 3 during an initial operation in a worksite to refine node location in relation to worksite map 712, for example.

In one illustrative example, a node topology map may consist of a list of nodes and a list of which nodes are connected to each other. In another illustrative example, a node topography map may consist of the information in the node topology map plus the latitude and longitude of each of the nodes or alternately the distance and headings between each of the nodes. In yet another illustrative example, a worksite map may contain information about the work areas, such as ground cover, tasks permitted or scheduled in the work areas, past work performed in the work areas, and tasks to be performed in the work areas in the future.

Keep-out map 718 may be, for example, without limitation, a map stored in number of worksite maps 710, which includes excludable worksite areas for a worksite, such as worksite 116 in FIG. 1, for example. Keep-out map 718 may be generated by a user, such as user 108 in FIG. 1 for example, identifying worksite areas that the autonomous machine is excluded from entering during operation within a worksite.

Event database 704 includes event schedule 720 and number of excludable worksite areas 722. Event schedule 720 may include a timeline or schedule associated with number of excludable worksite areas 722, indicating a time or event during which one or more of number of excludable worksite areas 722 are active, for example. In an illustrative example, a first worksite area may be excludable after the event of rain because the first worksite area is in a low lying area of a worksite that remains wet after a rain and presents a hazard for an autonomous machine. In another illustrative example, a first worksite area may be excludable on a specific day of the week due to an activity scheduled for that area that is incongruous with the operation of an autonomous machine in that area.

Excludable worksite areas database 706 may include number of conditionally excludable worksite areas 724, number of static excludable worksite areas 726, number of active excludable worksite areas 728, and number of inactive excludable worksite areas 730. Number of conditionally excludable worksite areas 724 is a list of worksite areas associated with a number of conditions that, when met, result in the worksite areas being excludable to an autonomous machine. For example, a conditionally excludable worksite area may be an area that is excludable based on in situ parameters for the area, such as ground condition. In another example, a conditionally excludable worksite area may be an area that is excludable based on current weather conditions.

Number of static excludable worksite areas 726 is a list of worksite areas that are always excludable for an autonomous machine. A static excludable worksite area may be, for example, a fish pond in a yard. Number of active excludable worksite areas 728 may be a list of current excludable areas based on the current time or day, for example. Number of inactive excludable worksite areas 730 may be a list of excludable areas that have been excludable and may be excludable in the future, but are not currently excludable to an autonomous machine, for example.

Worksite areas database 708 may include in situ parameter measurements 732 and historical data 734. In situ parameter measurements 732 may be current in situ measurements of parameters for a number of worksite areas that are used by conditional behavior module 326 in FIG. 3 to determine if a condition is met for exclusion of an autonomous machine, for example. In situ measurements may be taken by an autonomous machine using a sensor system, such as sensor system 312 in FIG. 3, in one illustrative example. In another illustrative example, the in situ measurements may be taken by a remote system and stored in worksite areas database 708 for access by an autonomous machine. Historical data 734 may be a collection of past measurements taken for a worksite area. Historical data 734 may be used to estimate a current condition, for example, when current measurements are unavailable, in one illustrative embodiment.

The illustration of worksite database 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
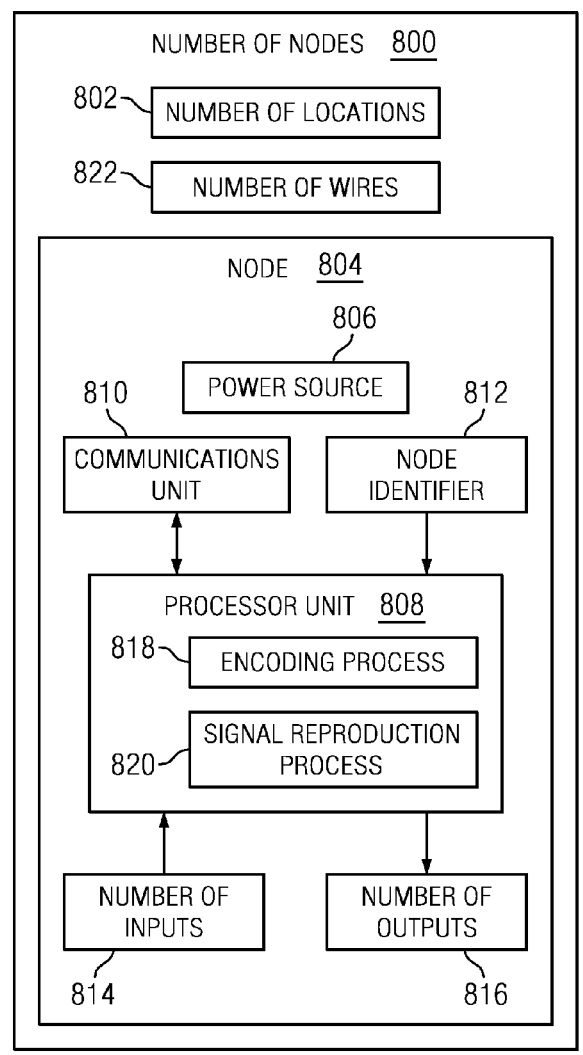
FIG. 8 is a block diagram of a number of nodes in accordance with an illustrative embodiment.

With reference now to FIG. 8, a block diagram of a number of nodes is depicted in accordance with an illustrative embodiment. Number of nodes 800 is an illustrative example of one implementation of number of nodes 126 in FIG. 1.

Number of nodes 800 may be located at number of locations 802. Number of locations 802 may be any number of physical locations associated with a worksite, such as worksite 116 in FIG. 1, for example. Node 804 is an example of one type of node in number of nodes 800.

Node 804 includes power source 806, processor unit 808, communications unit 810, node identifier 812, number of inputs 814, and number of outputs 816. Power source 806 may by any type of power supply including, without limitation, an alternating current (AC) power supply external to node 804, a direct current (DC) power supply external to node 804, an energy storage device, a solar cell, a fuel cell, a battery, mobile battery re-charger, ultra-capacitor, gas powered generator, photo cells, and/or any other suitable power source.

Processor unit 808 may be an example of one implementation of data processing system 200 in FIG. 2. Processor unit 808 includes encoding process 818 and signal reproduction process 820. Encoding process 818 encodes node identifier 812 into a signal transmitted from node 804 using number of outputs 816. Signal reproduction process 820 receives a signal from number of inputs 814 and reproduces the signal on at least one of number of outputs 816

Communications unit 810 may provide communications links to processor unit 808 to receive information. This information includes, for example, data, commands, and/or instructions. Communications unit 810 may take various forms. For example, communications unit 810 may include a wireless communications system, such as a cellular phone system, a Wi-Fi wireless system, or some other suitable wireless communications system.

Communications unit 810 may also include a communications port, such as, for example, a universal serial bus port, a serial interface, a parallel port interface, a network interface, or some other suitable port to provide a physical communications link. Communications unit 810 may be used to communicate with an external control device or user, such as user 108 in FIG. 1, for example.

Node identifier 812 may be a unique identifier of node 804 that distinguishes node 804 from other nodes in number of nodes 800. Node identifier 812 may correspond to a unique location in number of locations 802, for example. In another illustrative embodiment, node identifier 812 may correspond to a worksite area, or region, within a worksite, such as worksite 116 in FIG. 1, for example. Node identifier 812 may be a unique number, such as a manufacturing serial number, in one illustrative example. In another illustrative example, node identifier 812 may be derived from or encode information such as, for example, without limitation, information related to the node location within the work area, a number of physical attributes of the node, and/or any other suitable information.

Number of inputs 814 may be any type of input configured to receive a signal. Number of outputs 816 may be any type of output configured to transmit a signal. In these examples, a signal may refer to a wired signal, an infrared signal, an electrical signal, an optical signal, a laser signal, a radar signal, a radio frequency identification signal, and/or any other suitable signal. In an illustrative example, number of outputs 816 may include, without limitation, a wire radiating a signal, a visual indicator, a light beam, an infrared beam, an energy beam, an electromagnetic field, a chemical indicator, a radio frequency identification tag, and a radioactive indicator.

In one example, a first node from number of nodes 800 and a second node from number of nodes 800 may be used to define a straight line segment of a boundary. The output signal of the first node may be received by the input of the second node. Furthermore, in one illustrative embodiment, the signal transmitted from the first node to the second node may include node identifier 812 of the first node and preferably the identifiers of both first and second nodes encoded on the signal. An autonomous machine receiving this signal could decode the information in the signal to determine it as at the boundary segment defined by the first and second nodes, for example.

Number of nodes 800 may also include number of wires 822 connecting number of nodes 800 via number of inputs 814 and number of outputs 816, in an illustrative example.

The illustration of number of nodes 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
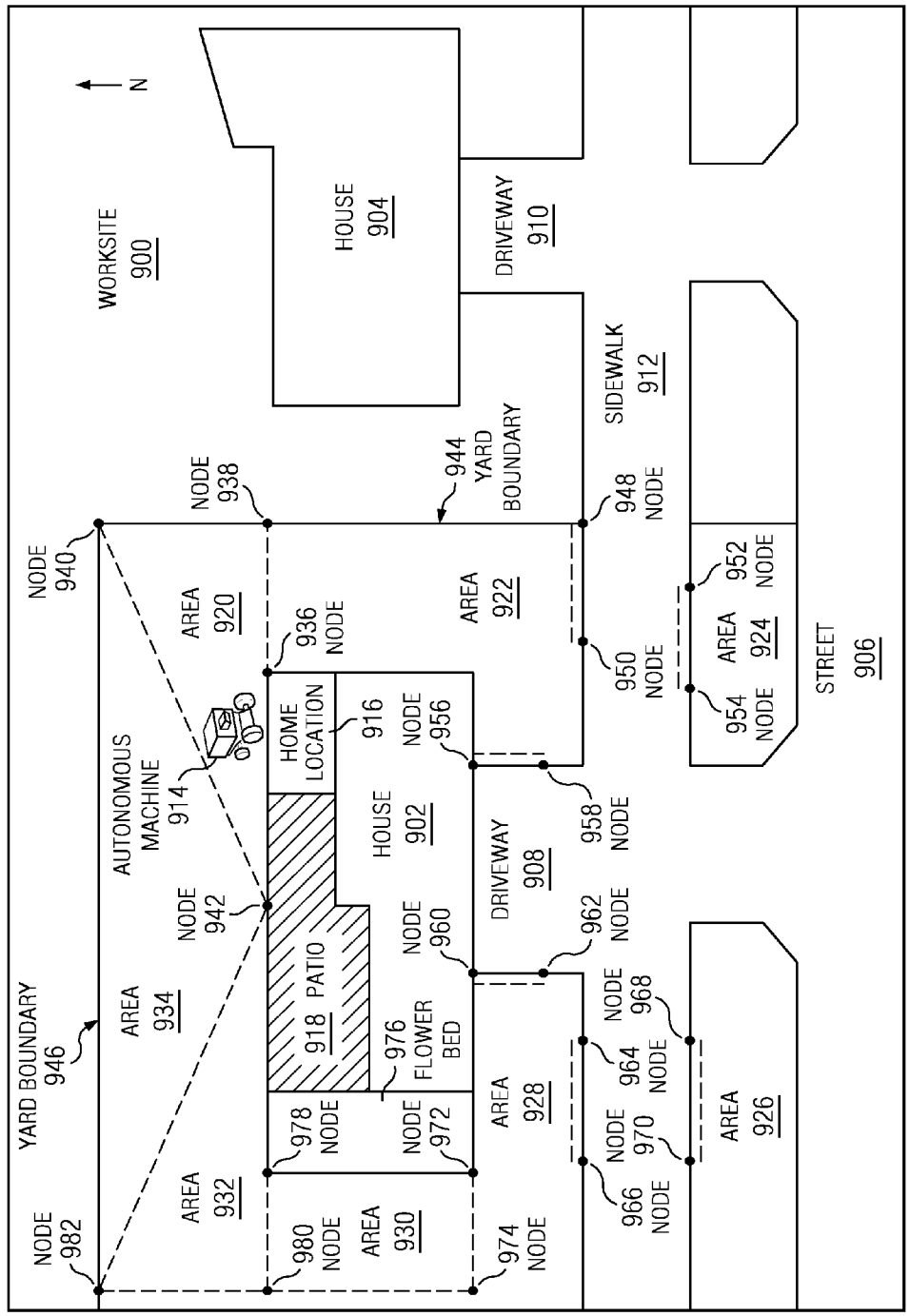
FIG. 9 is a block diagram of a worksite in accordance with an illustrative embodiment.

With reference now to FIG. 9, a block diagram of a worksite is depicted in accordance with an illustrative embodiment. Worksite 900 is an illustrative example of one implementation of worksite 116 in FIG. 1.

Worksite 900 may be associated with a residence in this illustrative example. House 902 is surrounded by a yard that comprises worksite 900. House 904 may be a neighboring house that is outside worksite 900. House 902 is an illustrative example of a structural feature within worksite 900. House 902 and house 904 may be residences along street 906, in this illustrative example. Driveway 908 leads from street 906 to house 902, while driveway 910 leads from street 906 to house 904, in this example. Sidewalk 912 defines a walkway parallel to street 906 and crossing driveway 908 and driveway 910.

Autonomous machine 914 is implemented to operate within worksite 900 in this illustrative example. Autonomous machine 914 is an illustrative example of one implementation of autonomous machine 112 in FIG. 1. Autonomous machine 914 may be docked, or stored, at home location 916 in this example. Home location 916 is an illustrative example of one implementation of home location 132 in FIG. 1. Home location 916 is disposed adjacent to house 902 and patio 918 in this illustrative example.

Worksite 900 is comprised of a number of worksite areas, including area 920, area 922, area 924, area 926, area 928, area 930, area 932, and area 934. Area 920, area 922, area 924, area 926, area 928, area 930, area 932, and area 934 may be an illustrative example of number of worksite areas 120 in FIG. 1. These worksite areas are defined using a number of nodes. Area 920 is defined using node 936, node 938, node 940, and node 942. In an illustrative embodiment, node 936 and node 938 may be implemented as a node pair, configured to act as a portal between area 920 and area 922. Node 938 and node 940 are disposed along yard boundary 944. Yard boundary 944 may be implemented using additional boundary markers, such as a fence, perimeter wire, and/or any other suitable marker, in an illustrative example. Yard boundary 946 may also be implemented using additional boundary markers, in one illustrative example. In an illustrative embodiment, node 940 and node 942 may be implemented as a node pair, configured to act as a portal between area 920 and area 934.

Area 922 may include node 948 and node 950 on the south boundary of area 922. Node 948 and node 950 may be implemented as a node pair, configured to act as a portal between area 922 and area 924. Sidewalk 912 separates area 922 from area 924, providing a traversable area that is not a worksite area within worksite 900. A traversable non-worksite area may be an area that is within worksite 900 but not within the parameters of a set of tasks, such as number of tasks 118, for the worksite. In one illustrative example, where the set of tasks include mowing the lawn within worksite 900, sidewalk 912 and driveway 908 may be traversable areas that are not within the parameters of lawn mowing, but must be crossed to reach other worksite areas that include grass to be mowed, such as area 924 and area 926.

In an illustrative example, autonomous machine 914 may operate to perform a number of tasks within area 922. Upon reaching node 948 and node 950, autonomous machine 914 may determine whether a number of conditions have been met for area 922. The number of conditions may include, for example, without limitation, there is work to be performed in area 924, autonomous machine 914 has adequate power supply to work in area 924, autonomous machine 914 has adequate supply of materials to work in area 924, autonomous machine 914 has adequate storage capacity to work in area 924, there is not a higher priority activity requiring the exclusion of autonomous machine 914 from area 924, entry into area 924 allows autonomous machine 914 to reach a destination, and/or any other suitable condition.

Autonomous machine 914 may also make an estimation of the amount of work performed for area 922 before leaving area 922 using performance estimation module 322 in FIG. 3, for example. When autonomous machine 914 crosses a boundary defined by node 948 and node 950, autonomous machine 914 may use dead reckoning, visual guidance, or some other form of machine guidance to travel across sidewalk 912 and reach area 924. In one illustrative example, autonomous machine 914 may detect node 952 and/or node 954 and travel towards a signal until it crosses a boundary defined by node 952 and node 954.

The location and spacing of node portals are such that autonomous machine 914 will have a high probability of traveling between portals using dead reckoning, visual guidance, or other guidance capabilities implemented on autonomous machine 914. If there is a major course issue, this may be noted by boundary detection process 320 of navigation system 300 when the next portal segment is detected. For example, autonomous machine 914 may reach node 956 and node 958, and cross over driveway 908 to reach area 928. If autonomous machine passes through node 960 and node 962, it can identify that autonomous machine 914 has traveled a true course west from the portal segment defined by node 956 and node 958. If autonomous machine 914 crosses a node portal between node 962 and node 964, the autonomous machine will know it has drifted south while crossing driveway 908.

Node 964 and node 966 provide a south boundary identifier for area 928 in addition to the visual difference between sidewalk 912 and grass in area 928. Node 964 and node 966 may provide a node portal for access across sidewalk 912 to area 926. Area 926 may be defined using node 968 and node 970. The north end of area 928 may be defined using node 972 and node 974, visual differences between flower bed 976 and grass in area 928, and vertical barrier provided by house 902. Node 972 and node 974 may provide a node portal for access from area 928 to area 930. Area 930 may be adjacent to flower bed 976. Flower bed 976 may be an illustrative example of an excludable worksite area. Area 932 is defined by node 978, node 980, and node 982. Node 982 may also be paired with node 942 to define a boundary between area 932 and area 934.

In an illustrative example, the boundaries of the number of worksite areas of worksite 900 may be defined by wires carrying a signal between the nodes of the worksite. In another illustrative example, the boundaries of a number of worksite areas of worksite 900 may be defined by visual means, such as green grass, grey concrete, black dirt, and/or any other suitable visual means.

Each node in worksite 900 may have a unique node identifier, such as node identifier 812 for node 804 in FIG. 8, for example. Each node may emit its node identifier, in one illustrative embodiment. In another illustrative embodiment, a wire carrying a signal between nodes may have an encoded node identifier for each node at either end of the wire, for example.

The illustration of worksite 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
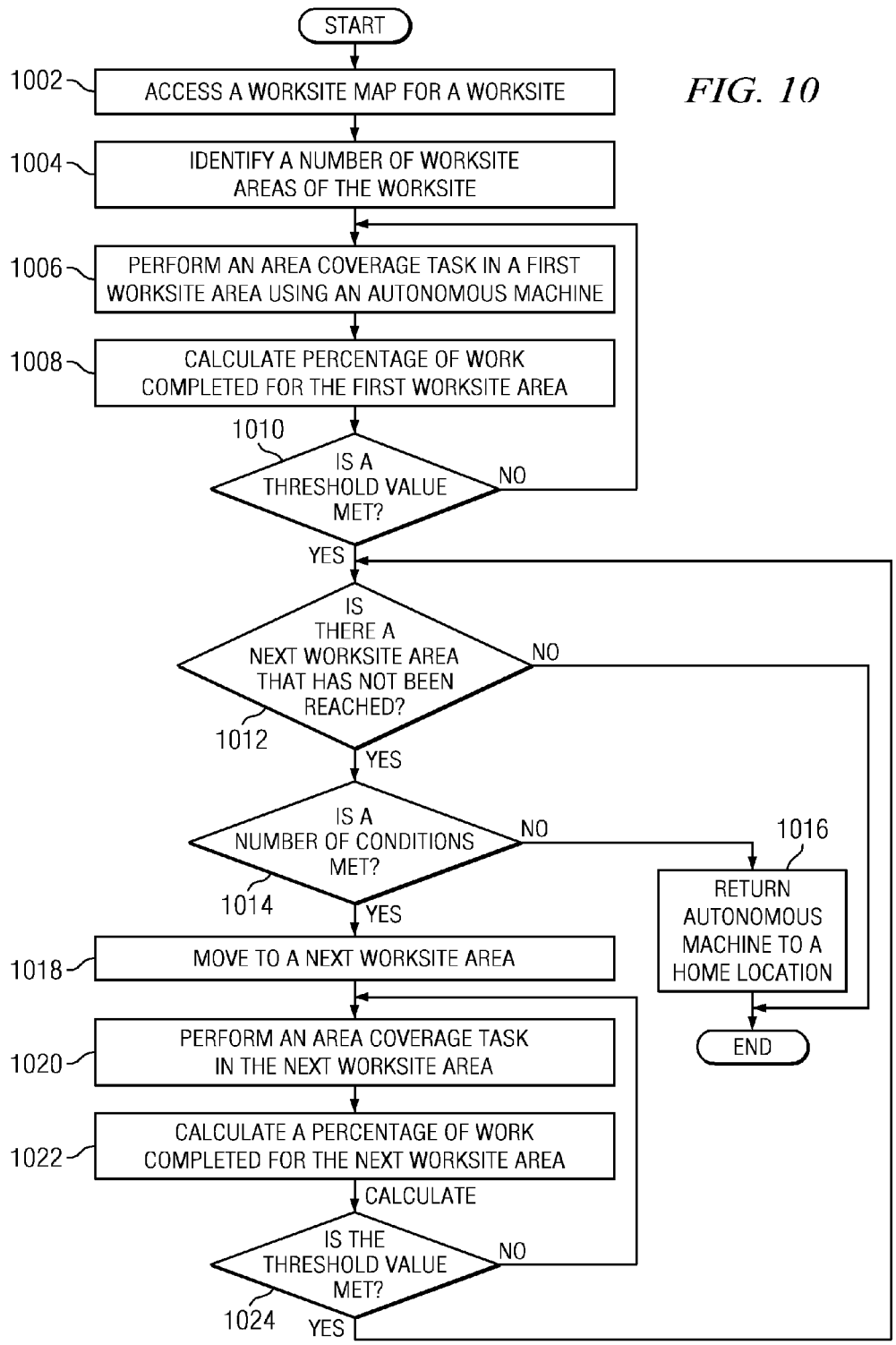
FIG. 10 is a flowchart illustrating a process for managing autonomous machines in a number of worksite areas in accordance with an illustrative embodiment.

With reference now to FIG. 10, a flowchart illustrating a process for managing autonomous machines in a number of worksite areas is depicted in accordance with an illustrative embodiment. The process in FIG. 10 may be implemented by a component such as navigation system 300 in FIG. 3, for example.

The process begins by accessing a worksite map for a worksite (step 1002). The worksite map may be accessed from a worksite database, such as worksite database 308 in FIG. 3 and/or worksite database 700 in FIG. 7. The process identifies a number of worksite areas of the worksite (step 1004). The number of worksite areas may be a number of regions, or sub-areas, within a worksite, such as number of worksite areas 120 for worksite 116 in FIG. 1.

The process performs an area coverage task in a first worksite area using an autonomous machine (step 1006). The area coverage task may be any type of task such as, for example, without limitation, a service task, a field task, mowing, snow removal, leaf removal, lawn watering, vacuuming, cleaning, material gathering, material application, sensing, data collection, and/or any other type of task. The area coverage task may be, for example, without limitation, mowing an area of a yard associated with a worksite. The process may operate an autonomous machine to perform the area coverage task, such as autonomous machine 112 in FIG. 1, for example. The process then calculates a percentage of work completed for the first worksite area (step 1008). The process uses a performance estimation module, such as performance estimation module 322 in FIG. 3, to calculate the percentage of the work an autonomous machine estimates is complete for a worksite area. The percentage of work may be calculated based on at least one of a percentage of area covered by the autonomous machine relative to the total area of a worksite area, an amount of time spent in the worksite area, an amount of energy expended in the worksite area, an amount of material applied in the worksite area, the amount of material gathered in the worksite area, and/or any other suitable parameter.

The process determines whether a threshold value is met (step 1010). The threshold value may be a pre-set threshold configured by a user, such as user 108 in FIG. 1, a predetermined threshold stored in behavior database 306 in FIG. 3, and/or any other suitable threshold value. In an illustrative example, if the threshold value is eighty-five percent, the threshold value will be met if the calculation for the percentage of work completed is eighty-five percent or more. If a determination is made that the threshold value is not met, the process returns to step 1006 and continues performing the area coverage task in the first worksite area.

If a determination is made that the threshold value is met, the process then determines whether there is a next worksite area that has not been reached (step 1012). If a determination is made that there is not a next worksite area, the process terminates.

If a determination is made that there is a next worksite area that has not been reached, the process then determines whether a number of conditions is met (step 1014). The number of conditions may include at least one of, for example, without limitation, identification of work to be performed in a next area, the autonomous machine performing the area coverage tasks has adequate power supply to work in a next area, the autonomous machine performing the area coverage tasks has adequate supply of materials to work in a next area, the autonomous machine performing the area coverage tasks has adequate storage capacity to work in a next area, there is not a higher priority activity requiring the exclusion of the autonomous machine performing the area coverage tasks from a next area, entry into a next area allows the autonomous machine performing the area coverage tasks to reach a destination, and/or any other suitable condition.

If a determination is made that the number of conditions is not met, the process returns the autonomous machine to a home location (step 1016), with the process terminating thereafter.

A home location may contain means for returning an autonomous machine to a state where an area coverage task may be resumed in the current or next worksite area, for example. Home location functions may include, for example, without limitation, recharging, refueling, loading material or data, unloading material or data, retooling, and/or any other suitable function.

If a determination is made that the number of conditions is met, the process moves to a next worksite area (step 1018). The next worksite area may be adjacent to the first worksite, across a traversable non-worksite area, and/or any other suitable location, for example. The process performs an area coverage task in the next worksite area (step 1020). The process then calculates a percentage of work completed for the next worksite area (step 1022). The process determines if the threshold value is met (step 1024).

If a determination is made that the threshold value is not met, the process returns to step 1020. If a determination is made that the threshold value is met, the process returns to step 1012, with the process iteratively repeating until a determination is made that there are no additional worksite areas that have not been reached.

Figure 11:
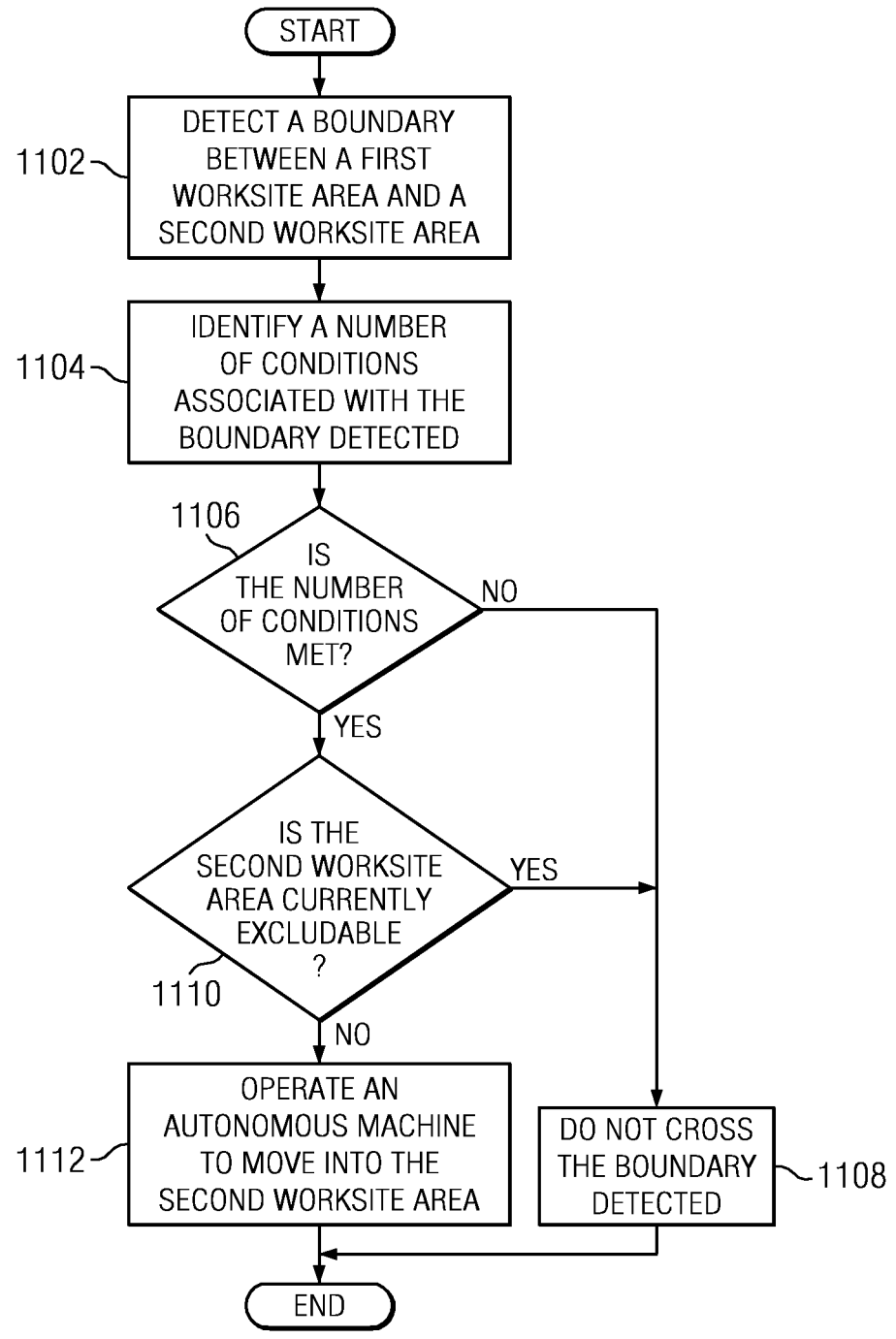
FIG. 11 is a flowchart illustrating a process for managing conditional behavior of an autonomous machine in accordance with an illustrative embodiment.

With reference now to FIG. 11, a flowchart illustrating a process for managing conditional behavior of an autonomous machine is depicted in accordance with an illustrative embodiment. The process in FIG. 11 may be implemented by a component such as navigation system 300 in FIG. 3, for example.

The process begins by detecting a boundary between a first worksite area and a second worksite area (step 1102). The boundary may be detected using boundary detection process 320 in FIG. 3, for example. The boundary may be defined by a number of nodes, such as number of nodes 126 in FIG. 1, for example.

The process identifies a number of conditions associated with the boundary detected (step 1104). The number of conditions may be identified using conditional behavior module 326 in FIG. 3, for example. The number of conditions may be associated with the boundary, the first worksite area, the second worksite area, the autonomous machine, and/or any other suitable component.

The process determines whether the number of conditions is met (step 1106). The process may access information about the number of conditions using worksite database 308 and/or behavior database 306 in FIG. 3, for example. If a determination is made that the number of conditions is not met, the process does not cross the boundary detected (step 1108), and the process terminates.

If a determination is made that the number of conditions is met, the process then determines whether the second worksite area is currently excludable (step 1110). The process may access information stored in worksite database 308 in FIG. 3 to determine whether the second worksite area is excludable to an autonomous machine. The second worksite area may be excludable based on a time, event, in situ parameter, and/or any other suitable reason.

If a determination is made that the second worksite area is currently excludable, the process proceeds to step 1108 and terminates. If a determination is made that the second worksite area is not currently excludable, the process then operates an autonomous machine to move into the second worksite area (step 1112), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for managing autonomous machines, the method comprising:
    identifying a number of worksite areas for a worksite;
    performing an area coverage task in a first worksite area in the number of worksite areas using an autonomous machine;
    calculating an amount of work completed for the first worksite area by the autonomous machine to form a calculated value;
    a processor determining whether a threshold value is met using the calculated value, wherein the threshold value is a value associated with a percentage of an area covered for the first worksite area relative to a total area for the first worksite area, and wherein the percentage of the area covered is less than the total area;

responsive to a determination that the threshold value is met, the processor determining whether there is a next worksite area that has not been reached by the autonomous machine;

responsive to a determination that there is a next worksite area that has not been reached by the autonomous machine, the processor determining whether a number of conditions is met; and responsive to a determination that the number of conditions is met, moving the autonomous machine to the next worksite area.

2. A method for managing autonomous machines, the method comprising:

identifying a number of worksite areas for a worksite;

performing an area coverage task in a first worksite area in the number of worksite areas using an autonomous machine;

calculating an amount of work completed for the first worksite area by the autonomous machine to form a calculated value;

a processor determining whether a threshold value is met using the calculated value, wherein the threshold value is a value associated with a percentage of an area covered for the first worksite area relative to a total area for the first worksite area, and wherein the percentage of the area covered is less than the total area;

responsive to a determination that the threshold value is met, the processor determining whether there is a next worksite area that has not been reached by the autonomous machine;

responsive to a determination that there is a next worksite area that has not been reached by the autonomous machine, the processor determining whether a number of conditions is met; and responsive to a determination that the number of conditions is not met, returning the autonomous machine to a home location.

3. The method of claim 1 further comprising:

performing an area coverage task in the next worksite area;

calculating a percentage of work completed for the next worksite area;

determining whether the threshold value is met; and responsive to a determination that the threshold value is not met, performing the area coverage task in the next worksite area.

4. The method of claim 1 further comprising:

accessing a worksite map for the worksite, wherein the worksite map is used to identify the number of worksite areas for the worksite.

5. The method of claim 1, wherein the number of worksite areas is at least one of a number of regions and a number of sub-areas of the worksite.

6. The method of claim 1, wherein the area coverage task is selected from at least one of a service task, field task, mowing, snow removal, leaf removal, lawn watering, vacuuming, cleaning, material gathering, material application, sensing, and data collection.

7. The method of claim 1, wherein the calculated value is calculated by the autonomous machine using a performance estimation module.

8. A system for autonomous machine management, the system comprising:

a number of autonomous machines configured to perform area coverage tasks in a worksite;

a number of boundaries for a number of worksite areas for the worksite;

a performance estimation module executed by a processor unit and configured to calculate a percentage of work completed in the number of worksite areas; and a navigation system configured to operate an autonomous machine in the number of autonomous machines to perform the area coverage tasks and move between the number of worksite areas, wherein the autonomous machine is configured to detect a boundary between a first worksite area and a second worksite area, calculate a percentage of work completed for the first worksite area, identify a number of conditions to be met for passage to the second worksite area, and move between the first worksite area and the second worksite area when a threshold value is met and the number of conditions identified is met, wherein the threshold value is a value associated with a percentage of an area covered for the first worksite area relative to a total area for the first worksite area, and wherein the percentage of the area covered is less than the total area.

9. The system of claim 8, wherein the number of boundaries are defined using a number of nodes.

10. The system of claim 8, wherein the performance estimation module calculates at least one of an amount of time spent in the worksite area, an amount of energy expended in the worksite area, an amount of material applied in the worksite area, an amount of data gathered in the worksite area, and the amount of material gathered in the worksite area.

11. The system of claim 8, wherein the autonomous machine is permitted to pass from a first worksite area in the number of worksite areas to a second worksite area in the number of worksite areas when a plurality of conditions are met.

12. The system of claim 11, wherein the plurality of conditions is selected from at least two of identification of work to be performed in the second worksite area, adequate power supply for the autonomous machine to work in the second worksite area, adequate supply of material to begin application in the second worksite area, adequate storage capacity to gather material in the second worksite area, lack of a higher priority activity requiring exclusion of the autonomous machine from the second worksite area, adequate memory storage capacity for storing sensor data from the second worksite area, and entry in the second worksite area enables the autonomous machine to reach a destination.

13. The system of claim 8, wherein the autonomous machine is further configured to return to a home location responsive to a determination that the number of conditions identified is not met.

14. The system of claim 13, wherein the home location is configured to return the autonomous vehicle to a state where an area coverage task may be performed by the autonomous vehicle at the second worksite area.

15. The system of claim 8, wherein the autonomous machine accesses a database when determining whether the number of conditions identified is met.

16. The system of claim 15, wherein the database comprises information pertaining to the area coverage tasks, including resources required to perform the area coverage tasks.

17. The method of claim 1, wherein the plurality of conditions is selected from at least one of identification of work to be performed in the second worksite area, adequate power supply for the autonomous machine to work in the second worksite area, adequate supply of material to begin application in the second worksite area, adequate storage capacity to gather material in the second worksite area, lack of a higher priority activity requiring exclusion of the autonomous machine from the second worksite area, adequate memory storage capacity for storing sensor data from the second worksite area, and entry in the second worksite area enables the autonomous machine to reach a destination.

\* \* \* \* \*